US006412586B1

(12) United States Patent
Askew

(10) Patent No.: US 6,412,586 B1
(45) Date of Patent: Jul. 2, 2002

(54) TOROIDAL EXHAUST VIBRATION ABSORBER

(75) Inventor: Gerald W. Askew, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/321,476

(22) Filed: May 27, 1999

(51) Int. Cl.[7] .................................................. F16F 7/00
(52) U.S. Cl. ....................... 180/309; 267/152; 188/380; 181/207
(58) Field of Search ............................... 188/378, 379, 188/380, 268; 267/152, 153, 292; 180/309, 300, 299; 181/207, 208, 209, 227, 228; 174/42

(56) References Cited

U.S. PATENT DOCUMENTS

| | | | |
|---|---|---|---|
| 2,856,020 A | * 10/1958 | Hoagg et al. ............... 180/309 |
| 2,969,416 A | * 1/1961 | McGavern ................... 174/42 |
| 3,142,610 A | * 7/1964 | Lowe .......................... 188/268 |
| 3,188,644 A | * 6/1965 | Sielaff ........................ 174/42 |
| 3,246,073 A | * 4/1966 | Bouche et al. .............. 174/42 |
| 3,837,327 A | * 9/1974 | Saunders et al. ........... 188/268 |
| 3,856,107 A | * 12/1974 | Rabett et al. ............... 188/268 |
| 3,911,199 A | * 10/1975 | Fischer ........................ 174/42 |
| 4,044,628 A | * 8/1977 | Jacks .......................... 188/268 |
| 4,471,853 A | * 9/1984 | Callaghan et al. .......... 180/309 |
| 4,858,738 A | * 8/1989 | Novoa ......................... 188/268 |
| 5,098,226 A | * 3/1992 | Venugopal ................... 405/205 |
| 5,853,018 A | * 12/1998 | DeLand et al. .............. 137/15 |

* cited by examiner

Primary Examiner—Michael Mar
(74) Attorney, Agent, or Firm—Jeffrey P. Calfa; Neil T. Powell; Dennis Kelly Sulliv

(57) ABSTRACT

A mechanism and method for stabilizing vibrations in vertical exhaust systems for over highway trucks. A mass-spring absorber having a natural frequency that corresponds to the natural frequency of the vertical exhaust system, which we are trying to stabilize, is secured to the vertical exhaust system. The mass-spring absorber dampens the natural frequency of the exhaust system and creates an anti-resonance to the offending resonance frequency. The mass of the spring-mass system has a generally toroidal shape such that it surrounds the vertical exhaust stanchion and is connected thereto by a spring or springs. The mass of the toroidal shaped absorber is maximized, which results in maximum separation between the new natural frequencies of the vertical exhaust system, while at the same time the damping between the vertical exhaust system and the toroidal shaped absorber is minimized. This coordinated maximizing the mass and minimizing the resiliency of the spring or springs results in minimizing the amplitude of the vibrations in the region of excitation.

5 Claims, 3 Drawing Sheets

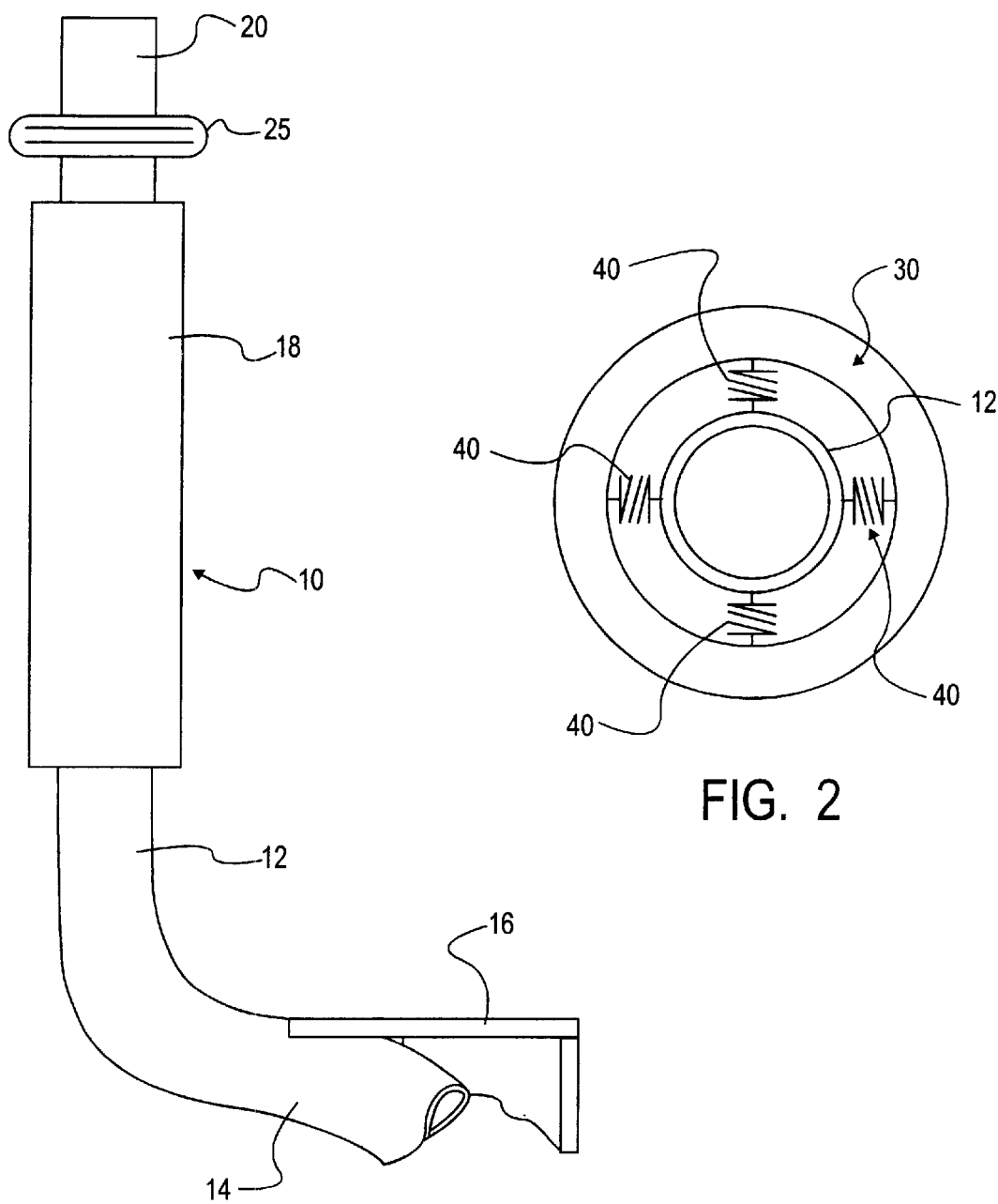

TOROIDAL EXHAUST VIBRATION ABSORBER

BACKGROUND OF THE INVENTION

Vertical exhaust systems in the form of a stanchion are used on many heavy duty truck configurations. A vertical exhaust system has a natural frequency at which it tends to vibrate. This natural frequency can be attributed to the physical shape and dimension of the system. The natural frequency of a vertical exhaust/stanchion assembly is primarily dictated by its length which is functional in nature and cannot be altered substantially.

During on road operation of a truck, the vertical exhaust systems receive vibration pulses; for example, from engine combustion and road irregularities which substantially increase the rate at which the exhaust system is vibrating. The vibration of vertical exhaust systems are under certain conditions exacerbated by the amplitude of the excitation pulses. For example, when a short wheel base highway tractor is operating with no semi-trailer (a condition known as bob-tail), the truck undergoes harsh excitation when, due to an irregularity in the road, the vehicle is unable to "recover" from a vibration caused by the road irregularity received from the front axle before experiencing a vibration also caused by the road irregularity inputted from the rear axle. Also significant in this situation is the disproportionate spring rate, damping value and hysteresis of the rear suspension which is designed to carry a much greater load than that which is present when in the bob-tail configuration.

Furthermore, the incoming excitation pulses received by a vertical exhaust system are at or near the natural frequency of the vertical exhaust system which causes the vertical exhaust system to approach and sometimes reach resonance. Reaching resonance can result in the destruction of the vertical exhaust systems. As a result, vertical exhaust systems have traditionally had a relatively short life cycle.

The past efforts to increase the longevity of vertical exhaust systems have centered around increasing the stiffness of the system sufficiently to reduce vibrations to within acceptable amplitudes. These efforts have had limited success and do little to solve the resonance problem. As a result, current vertical exhaust systems have a relatively short life cycle and must be replaced periodically during the life of the vehicle.

It has been determined that destructive resonance can develop in vertical exhaust systems due to the fact that the natural frequency, $W_n$, of the exhaust system corresponds to an excitation frequency, $W_p$, to which the system is exposed. These excitation frequencies have been attributed to inputs from the road and engine. The natural frequency for vertical exhaust systems for use on heavy duty trucks is about 11 hertz. The excitation pulses that are received from the road fall within a range of 2–11 hertz and engine combustion inputs are in the area of 10 hertz.

Oscillating objects have a natural frequency, which is the frequency that the oscillating object tends to settle into if it is not disturbed. Frequency is the term used to denote the number of times that any regularly recurring phenomenon occurs in one second. The number of cycles per second that an object oscillates is called a hertz (Hz). For example, the natural frequency of a pendulum that is one meter long is 0.5 Hz, which means the pendulum swings back and forth once every 2 seconds. For physical objects, there is usually a relationship between the frequency at which they vibrate (the natural frequency) and the physical dimensions of the vibrating object. Thus, the time required by a pendulum to make one complete swing is partly determined by the length of the pendulum. The shorter the pendulum, the higher will be its natural frequency.

If this pendulum were to be struck lightly once every 2 seconds, the amplitude of the swing would gradually increase and eventually the amplitude of oscillation would become very large. This phenomenon in which a relatively small, repeatedly applied force causes the amplitude of an oscillating system to become very large is called resonance. When an object reaches resonance, serious problems can develop. However, if the proper damping mechanism is utilized, reaching resonance can be avoided. The force that causes vibrations or oscillation to stop is called damping. The most common damping force acting on mechanical mechanisms is friction. However, other damping forces are also available.

BRIEF SUMMARY OF THE INVENTION

This invention is based on the concept that, by applying a spring-mass absorber to a vertical exhaust system, an anti-resonance will be created that will stabilize the vertical exhaust system. The natural frequency of the spring-mass must correspond to the offending resonance frequency of the vertical exhaust system which we are trying to stabilize.

The mass of the spring-mass system has a generally toroidal shape such that it surrounds the vertical exhaust stanchion and is connected thereto by a spring or springs. The term "toroidal," as used herein, means generally shaped similar to a torus or toroid and is not limited to a closed curve having a specific shape.

Consistent with this concept, the greater the mass, the wider is the range of excitations that it will dampen. However, a vertical exhaust system is basically a cantilevered beam and there is a limit to how much additional mass can be applied to its free end. When the vehicle is stopped, the momentum of the additional mass will tend to bend the vertical exhaust system forward and, when the vehicle accelerates, the additional mass will tend to bend the vertical exhaust system backward. Also, as the stiffness of the spring for the spring-mass absorber increases, the amplitude of the vibrations in the region of excitation also increases, which is undesirable. Thus, the application of the concept to a particular vertical exhaust requires consideration of the specific vertical exhaust system and then compromising and balancing the quantity of the mass and the stiffness of the spring.

This concept has been used, for example, to dampen vibrations in marine structures that are caused by waves striking the structure. Reference may be made to U.S. Pat. No. 5,098,226 for an example where a toroidal absorber tank is installed on the marine structure and tuned to the desired damping frequency by varying the depth of liquid in the tank.

Another example of the use of this concept is in flow regulators where resonance is produced in conduits of certain lengths. To resolve this problem inertial mass is resiliently mounted on the conduit and serves to dampen vibration caused by pressure pulses in the fluid supply conduit. Reference may be made to U.S. Pat. No. 5,853,018 for an example of such a device.

BRIEF DESCRIPTION OF SEVERAL VIEWS OF THE DRAWINGS

FIG. 1 shows a vertical exhaust having a toroidal absorber attached.

FIG. 2 is a sketch of an idealized representation of the toroidal absorber.

DETAILED DESCRIPTION OF THE INVENTION

Figure 3:
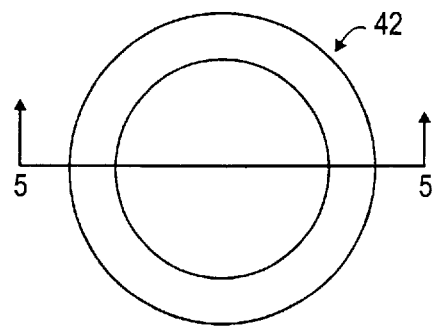
FIG. 3 is a top view of an embodiment of the spring to be used in the toroidal absorber.

A vertical exhaust stanchion 10 is shown in FIG. 1. The lower end 14 of the vertical exhaust pipe 12 is secured to a vehicle support 16. The exhaust gases from the engine are collected in the engine exhaust manifold and exit the manifold into the lower end 14 of the vertical exhaust pipe 12. The exhaust gases flow upwardly into the muffler 18 where they encounter a labyrinth flow path and finally exit the muffler 18 into the upper end 20 of the vertical exhaust pipe 12. The toroidal absorber 25 is shown attached to the upper end 20 of the vertical exhaust pipe 12 above the muffler 18.

An idealized representation of a toroidal absorber is shown in FIG. 2. In this view, a cast iron toroid 30 is suspended by four springs 40 from the vertical exhaust pipe 12. The natural frequency of the toroidal absorber corresponds to the natural frequency of the vertical exhaust system and thus functions to dampen vibrations in the vertical exhaust system.

Figure 4:
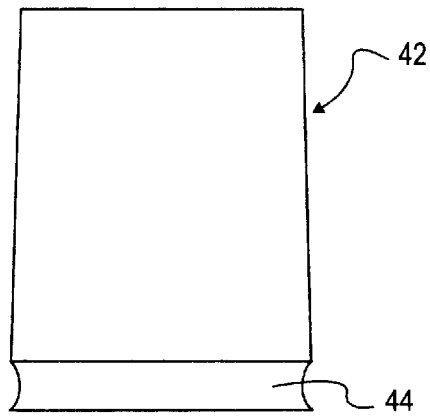
FIG. 4 is a front view of the embodiment of the spring shown in FIG. 3.
Figure 5:
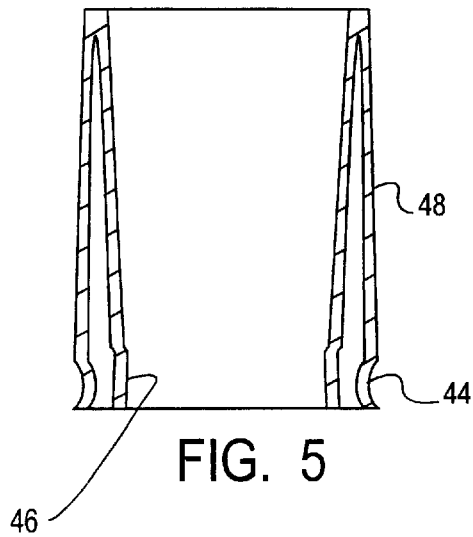
FIG. 5 is a cross-sectional view of the embodiment of the spring shown in FIGS. 3 and 4 taken along lines 5—5 of FIG. 3.

FIGS. 3 through 5 show an embodiment of a specific spring 42 for use in this invention. FIG. 3 is a top view, FIG. 4 is a side view and FIG. 5 is a cross-sectional view taken along lines 5—5 of FIG. 3 of spring 42. In this embodiment, spring 42 is generally sleeve-shaped and includes a shallow rounded groove 44 that encircles the outer bottom edge. The toroidal absorber 30 is secured to the spring 42 along groove 44 by welding, adhesive or other conventional securing means. As best seen in FIG. 5, the cross section of each side of spring 42 has an upside down V-shape. There is a flat ring portion 46 along the inner bottom edge. The inner surface of the flat ring portion 46 is secured to the outer surface of the vertical exhaust pipe 12 by welding, adhesive or other conventional methods. The spring section 48 having upside down, V-shaped cross-sections extends from the upper edge of the flat ring portion 46 to the rounded groove 44. Spring section 48 can flex from a position at which one portion of the shallow rounded groove 44 is contacting the flat ring portion 46 to a second position where another portion of the shallow rounded groove 44 is contacting another portion of the flat ring portion 46.

Figure 6:
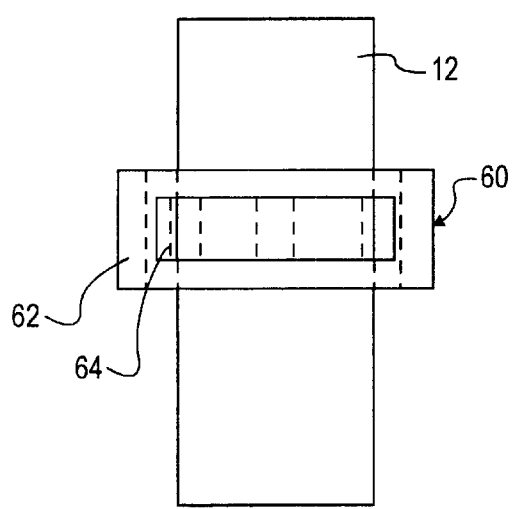
FIG. 6 is a front view of the toroidal absorber mounted on a vertical exhaust pipe in which another embodiment of the spring is used.
Figure 7:
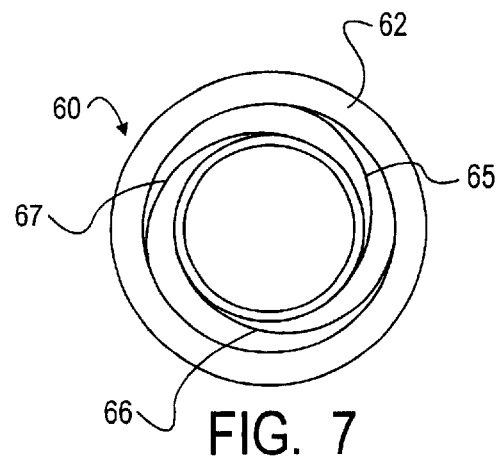
FIG. 7 is a top view of the toroidal absorber and vertical exhaust pipe seen in FIG. 6.

FIG. 6 shows a vertical exhaust pipe 12 having toroidal absorber 60 secured thereto. The toroidal absorber 60 employs a cast iron toroid 62 having a rectangular cross sections. However, the cross sections need not be rectangular. For example, they could be circular, semi-circular or any other closed, curve shape. The preferred embodiment of spring 64 is utilized for connecting the toroid 62 to the vertical exhaust pipe 12. As best seen in FIG. 7, the spring 64 of this embodiment is formed from three strips of spring steel 65–67. One end of each strip 65–67 is secured to the vertical exhaust pipe 12 and the other end, after wrapping partially around the exhaust pipe 12, is secured to the internal surface of the toroid 62.

Figure 8:
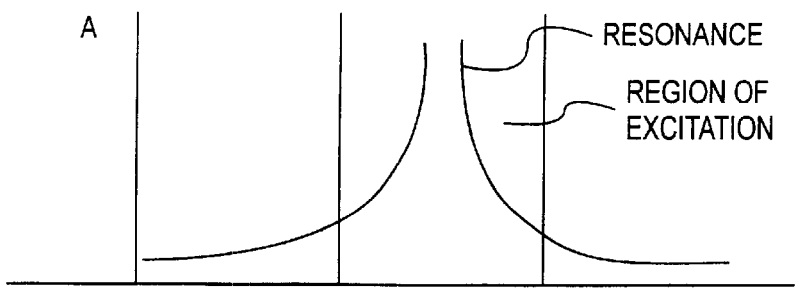
FIG. 8 is an amplitude frequency vibration graph of an undampened vertical exhaust system.

FIG. 8 is an amplitude-frequency vibration graph for a vertical exhaust system that has not been dampened. In this view and also in FIGS. 9–11, excitation frequency $W_f$ is plotted on the abscissa or X-axis and amplitude A is plotted on the ordinate or Y-axis. In FIG. 8, the two halves of the curve approach the boundaries of the region of excitation at low amplitude levels. After entering the region of excitation, the two halves of the curve increase in amplitude steeply and approach infinity, which in this situation is resonance. The excitation frequencies for this vertical exhaust system are the frequencies within the region of excitation. Impulses from outside sources having frequencies within this frequency range can damage the vertical exhaust system and force it into resonance. As seen in this graph, the amplitude of the vibration of the vertical exhaust system gradually increases as the frequency approaches the region of excitation and, once in the region of excitation, increases steeply to the point at which resonance occurred. As this vertical exhaust system approaches resonance, it will be seriously damaged or may even destruct.

Figure 9:
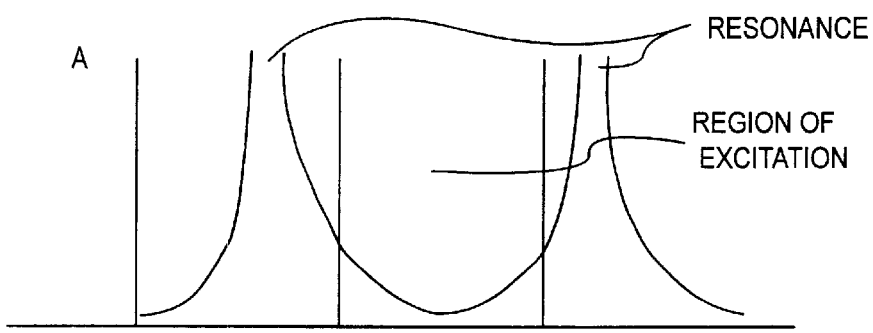
FIG. 9 is an amplitude frequency vibration graph of a vertical exhaust system that is dampened by a toroidal absorber.

FIG. 9 is an amplitude-frequency vibration graph for a vertical exhaust system that is dampened by a toroidal absorber. This graph illustrates the situation where the natural frequency of the vertical exhaust system has been determined and a toroidal absorber has been designed to have a natural frequency equal to that of the vertical exhaust system. FIG. 9 is the resulting amplitude-frequency graph after such a toroidal absorber was built and mounted on the vertical exhaust system in accordance with this invention. The toroidal absorber includes an element that has a certain mass and a spring or springs that have a certain flexibility that, together, result in a toroidal absorber having a natural frequency that is substantially equal to the natural frequency of the vertical exhaust system. As represented in this graph, the toroidal absorber has dampened the original natural frequency area of the curve that was within the region of excitation and has, in effect, split the original natural frequency of the exhaust system into two frequencies. Both of the new natural frequencies are, however, outside the range of excitation and the region of excitation is now located between the new pair of natural frequencies of the exhaust system.

As shown in FIG. 9, the region of excitation is located between the new pair of natural frequencies of the vertical exhaust system. The curve for the vertical exhaust system within the region of excitation has a low amplitude. As a result of the amplitude being low the life cycle of the vertical exhaust system has been greatly extended.

It should be noted that the natural frequency for a highway truck vertical exhaust system can be theoretically calculated and or determined empirically. The most determinative factor in the specific design being its length, which has little latitude for variation. The height of highway trucks is controlled by underpass heights and laws regulating their heights. As a result, for practical purposes, the natural frequency for a highway truck vertical exhaust system falls within a small range centered around 11 Hz. A toroidal-shaped weight having a natural frequency that corresponds to the natural frequency of the vertical exhaust system can be designed in accordance with the following formula:

$$W_n = (k/m)\,0.5$$

Where $W_n$ =natural frequency, k=spring consonant and m=mass.

The maximum damper mass that can be supported by the muffler tailpipe assembly should be determined. The greater the mass used on the spring-mass absorber system, the greater will be the separation of the pair of resulting natural frequencies. It is advantageous to separate the pair of resulting natural frequencies as much as possible because we are attempting to remove them from a fairly broad band of offending frequencies. Using the natural frequency of the vertical exhaust system and the above determined maximum mass solves the above formula for the spring consonant.

Figure 10:
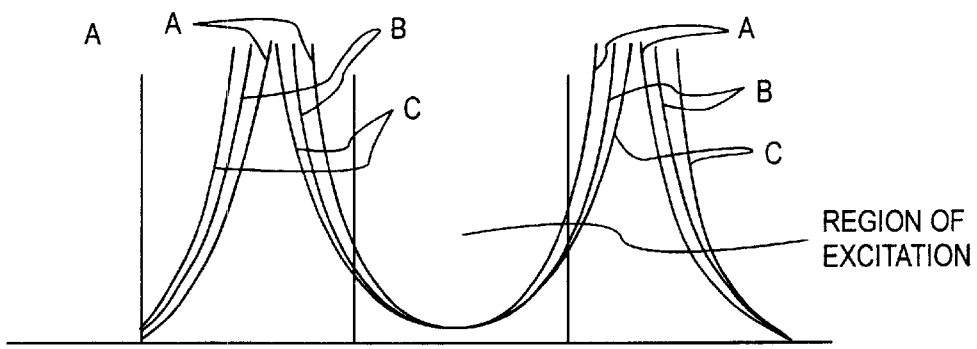
FIG. 10 is an amplitude frequency vibration graph of a vertical exhaust system that is dampened by a toroidal absorber showing the effect of increasing the mass of the spring-mass system.

FIG. 10 is an amplitude-frequency vibration graph of a vertical exhaust system that is dampened by a toroidal absorber in accordance with this invention. This graph illustrates how by increasing the mass of the toroidal absorber the separation between the pair of natural frequencies of the vertical exhaust system increases. In this Figure, the first curve, designated A, has the lowest mass. The third curve, designated C, has the highest mass. The curve designated B represents an exhaust system having an absorber with a mass between that of curves A and C. It is also shown in this Figure that curve C enters the region of excitation at a lower level than either curve A or B. This is, of course, desirable since the amplitude of the vibrations in the region of excitation is lowest for the C set of curves. However, the greater the mass of the toroidal shaped absorber, the less flexible the spring can be that connects the toroidal shaped absorber to the vertical exhaust system. Thus, in designing the mass-spring absorber, the mass of the toroidal shaped absorber and the flexibility of the connecting spring must be coordinated to minimize the amplitude of the vibrations in the region of excitation.

Figure 11:
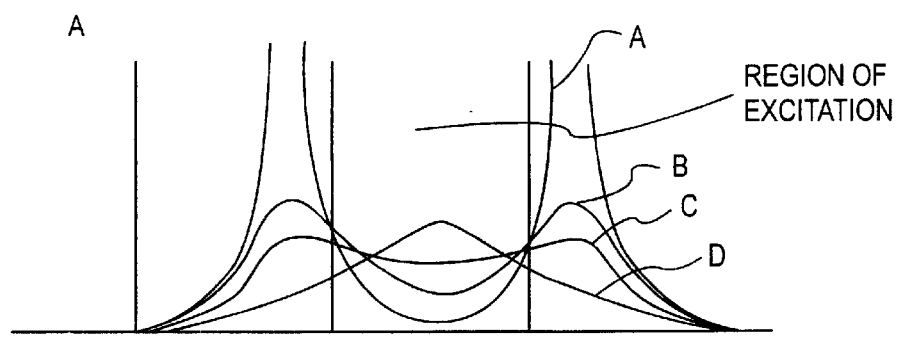
FIG. 11 is an amplitude frequency vibration graph of a vertical exhaust system that is dampened by a toroidal absorber illustrating that the effect of increasing the damping between the vibrating system and the absorber is to increase the amplitude of the vibrations in the region of excitation.

FIG. 11 is an amplitude-frequency vibration graph for a number of vertical exhaust systems that are dampened by a toroidal absorber in accordance with this invention. In this series of curves, the amount of damping has been increased as from curve A to curve D. This graph illustrates how by increasing the damping between the vertical exhaust system and the toroidal absorber there is a corresponding increase in amplitude of the portion of the curve between the pair of natural frequencies. This increase in amplitude lies within the region of excitation and is thus undesirable. The damping between the vibrating system and the absorber is increased for example by utilizing stiffer springs. The ultimate increase in stiffness would be to fix the absorber on the vibrating system, at which point you have returned to an un-dampened system, as is illustrated in FIG. 8, differing only in that an additional mass has been added to the system.

Thus, in designing the spring-mass absorber, it is desirable to maximize the mass of the absorber and minimize the stiffness of the spring connecting the absorber to the system.

The foregoing specification describes only preferred embodiments of the invention as shown. Other embodiments besides the ones described above may be articulated as well. The terms and expressions therefore serve only to describe the invention by example only and not to limit the invention. It is expected that others perceive differences which while differing from the foregoing, do not depart from the spirit and scope of the invention herein described and claimed.

What is claimed is:

1. A method of stabilizing the amplitude of vibrations occurring in a vertical exhaust system that are in excess of the systems natural frequency comprising the steps of:

determining the natural frequency of the vertical exhaust system;

providing a toroidal shaped absorber that is sized to surround a vertical exhaust pipe of said vertical exhaust system and has a natural frequency corresponding to the natural frequency of the vertical exhaust system;

maximizing the mass of said toroidal shaped absorber to cause a greater separation of new natural frequencies of the vertical exhaust system;

locating said toroidal shaped absorber such that it surrounds said vertical exhaust pipe; and connecting said toroidal shaped absorber to said vertical exhaust pipe by a spring which includes a first sleeve shaped member having a first end that is sized to be secured to said vertical exhaust pipe and a second end that is larger in diameter than said first end such that said first sleeve is spaced from said vertical exhaust pipe at said second end, and a second sleeve shaped member secured at one end to said first sleeve shaped member about the second end of said first sleeve shaped member and said toroidal shaped absorber is secured to the other end of said second sleeve shaped member.

2. The method of stabilizing the amplitude of vibration occurring in a vertical exhaust system as set forth in claim 1 wherein the method further includes the step of:

minimizing the damping between the vertical exhaust system and said toroidal shaped absorber to thereby minimize the amplitude of the curve between new natural frequencies of the vertical exhaust system.

3. A vertical exhaust system for a highway truck that receives potentially damaging vibration pulses within a region of excitation including:

a vertical exhaust pipe;

said vertical exhaust system having a known natural frequency;

a toroidal shaped absorber having a natural frequency that corresponds to the known natural frequency of said vertical exhaust system and functions to divide said known natural frequency into a pair of new natural frequencies;

said toroidal shaped absorber having a specific mass and being sized to surround said vertical exhaust pipe;

said specific mass of said toroidal shaped absorber being maximized which results in a greater separation between the new natural frequencies of the vertical exhaust system such that the amplitude of the vibrations for the vertical exhaust system in the region of excitation is diminished; and a spring connection between said toroidal shaped absorber and said vertical exhaust pipe to form a mass-spring system, said spring connection having specific flexibility which is a measure of the damping of the mass-spring system, said spring including a first sleeve shaped member having a first end that is sized to be secured to said vertical exhaust pipe and a second end that is larger in diameter than said first end such that said first sleeve is spaced from said vertical exhaust pipe at said second end, and a second sleeve shaped member secured at one end to said first sleeve shaped member about the second end of said first sleeve shaped member and said toroidal shaped absorber is secured to the other end of said second sleeve shaped member.

4. A vertical exhaust system for a highway truck as set forth in claim 3 wherein the invention further includes:

said specific flexibility of said spring connection is minimized to thus avoid increasing the amplitude of the vibrations in the region of excitation.

5. A vertical exhaust system for a highway truck as set forth in claim 3 wherein the invention further includes:

said specific flexibility of said spring connection is minimized to thus avoid increasing the amplitude of the vibrations in the region of excitation; and the maximizing of the specific mass of said toroidal shaped absorber and the minimizing of the specific flexibility of said spring being coordinated to provide a spring-mass system-that will minimize the amplitude of the vibrations in the region of excitation.

* * * * *